(12) United States Patent
Lee

(10) Patent No.: US 9,057,479 B2
(45) Date of Patent: Jun. 16, 2015

(54) WALL-MOUNTED AIDING MECHANISM AND WALL-MOUNTED DEVICE

(71) Applicant: HON HAI PRECISION INDUSTRY CO., LTD., New Taipei (TW)

(72) Inventor: Chien-Hung Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 31 days.

(21) Appl. No.: 13/958,637

(22) Filed: Aug. 5, 2013

(65) Prior Publication Data
US 2014/0034798 A1 Feb. 6, 2014

(30) Foreign Application Priority Data
Aug. 6, 2012 (TW) .............................. 101215093 U

(51) Int. Cl.
*F16M 11/00* (2006.01)
*F16M 13/02* (2006.01)
*F16M 11/04* (2006.01)

(52) U.S. Cl.
CPC ........... *F16M 13/022* (2013.01); *F16M 11/041* (2013.01); *F16M 13/02* (2013.01)

(58) Field of Classification Search
USPC ......... 248/370, 371, 372.1, 917–923, 220.21, 248/220.22, 225.11, 224.8, 222.41, 223.41, 248/224, 51, 224.61, 475.1, 476, 477
See application file for complete search history.

(56) References Cited

U.S. PATENT DOCUMENTS

| | | | | |
|---|---|---|---|---|
| 7,255,317 | B2* | 8/2007 | Huang et al. ................... | 248/371 |
| 8,297,571 | B2* | 10/2012 | Xue .......................... | 248/220.22 |
| 2006/0186290 | A1* | 8/2006 | Carnevali ................. | 248/221.11 |
| 2011/0019348 | A1* | 1/2011 | Kludt et al. .............. | 361/679.01 |
| 2012/0119046 | A1* | 5/2012 | Hsu et al. ................. | 248/222.14 |
| 2012/0175477 | A1* | 7/2012 | Tang et al. ............... | 248/222.14 |

* cited by examiner

*Primary Examiner* — Steven Marsh
(74) *Attorney, Agent, or Firm* — Novak Druce Connolly Bove + Quigg LLP

(57) ABSTRACT

An exemplary embodiment of a wall-mounted aiding mechanism for firmly attaching an object to a vertical wall and which is proofed against external impacts includes a casing, a sliding plate and an adjusting screw. The casing defines a first receiving space to receive the sliding block which performs a collaring or shearing action on a fastener such as a screw. The adjusting screw passes into the receiving space of the casing. The adjusting screw engages with the sliding block to lift the sliding block to a topmost position of the receiving space or disengages with sliding block to let the sliding block drop onto the neck of the fastener and hold it secure.

14 Claims, 9 Drawing Sheets

WALL-MOUNTED AIDING MECHANISM AND WALL-MOUNTED DEVICE

BACKGROUND

1. Technical Field

The present disclosure generally relates to a wall-mounted aiding mechanism for mounting a device on a wall and a wall-mounted device using the wall-mounted aiding mechanism.

2. Description of Related Art

Wall-mounted devices can be used on a wall. A typical wall-mounted device includes a main body and a plurality of mounting screws for mounting the main body on the wall. The main body may be an air conditioner, an LCD, a telephone, a clock, for example. A rear of the main body defines a plurality of mounting holes. Each mounting hole includes a collar hole and a guiding hole connecting each other. Each mounting screw includes a screw head and a fixing pole extending from the screw head. A distal end of the fixing pole is fixed in the wall. To fix the main body of the wall-mounted device on the wall, the screw heads and the fixing poles pass through the guiding holes, and the main body is pushed to move relative to the mounting screws to let the fixing poles of the mounting screws slide from the large guiding holes to the collar holes, and the fixing poles are thus blocked in the collar holes. The main body is supported on the mounting screws, and the main body is mounted on the wall.

However, when the main body of the wall-mounted device is impacted by an external object or force, the fixing poles are liable to slide from the collar holes to the guiding holes, and release the mounting screws from the mounting holes of the main body, such that the wall-mounted device tilts or falls from the wall.

What is needed, therefore, is a means which can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Reference will be made to the drawings to describe various embodiments.

Figure 1:
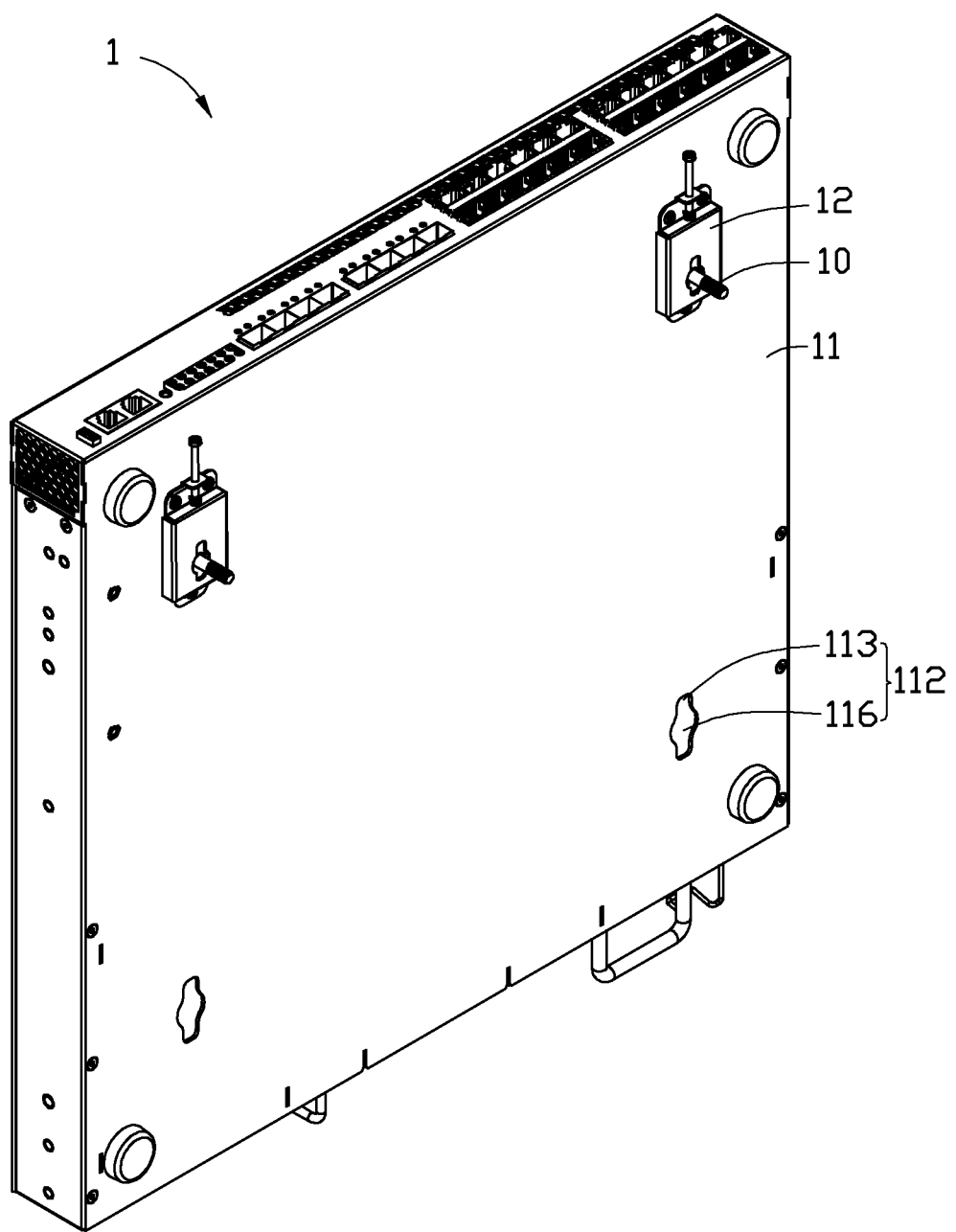
FIG. 1 is an isometric view of a wall-mounted device according to a first embodiment of the disclosure, and the wall-mounted device includes a main body, wall-mounted aiding mechanisms, and mounting screws.

Referring to FIG. 1, in one embodiment, a wall-mounted device 1 includes a main body 11, a plurality of mounting screws 10, and a plurality of wall-mounted aiding mechanisms 12. The main body 11 can be mounted on a wall via cooperation of the mounting screws 10 and the wall-mounted aiding mechanisms 12.

The main body 11 may be any body/structure which can be mounted on a wall, for example the main body 11 can be an air conditioner, an LCD, a telephone, a clock, for example. The main body 11 includes a plurality of first mounting holes 112. Each first mounting hole 112 includes a first guiding hole 116 and a first collaring hole 113 connecting with each other. The first guiding hole 116 has a greater overall diameter than a diameter of the first collaring hole 113.

Figure 2:
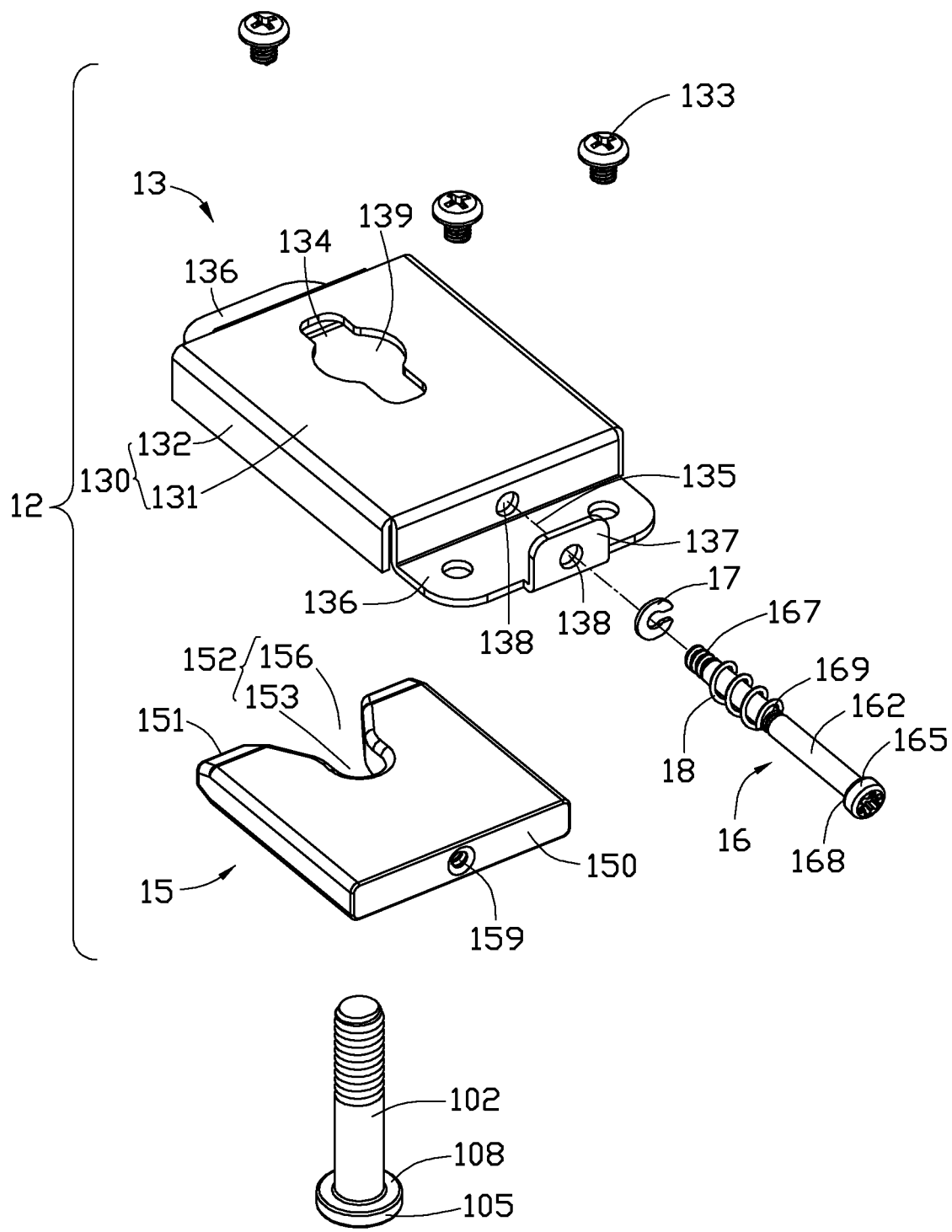
FIG. 2 is an exploded, isometric view of a wall-mounted aiding mechanism and a mounting screw of the wall-mounted device of FIG. 1, the wall-mounted aiding mechanism includes a casing, an adjusting screw, a sliding block, a washer and an elastic member.

In FIG. 2, each mounting screw 10 includes a screw head 105 and a fixing pole 102 connecting with the screw head 105. The screw head 105 has a greater diameter than a diameter of the fixing pole 102, and the fixing pole 102 extends from a first stopper surface 108 of the screw head 105. The mounting screws 10 can slide in the first mounting holes 112. The screw head 105 of the mounting screw can pass through the first guiding hole 116 and the fixing pole 102 can then be blocked in the first collaring hole 113.

Each wall-mounted aiding mechanism 12 includes a casing 13, a sliding block 15, an adjusting screw 16, a washer 17, and an elastic member 18.

The casing 13 includes a base body 130, two fixing plates 136, and a protruding plate 137. The base body 130 includes a bottom plate 131 and a plurality of sidewalls 132, and the bottom plate 131 and the sidewalls 132 cooperate to form a receiving space 134 to receive the sliding block 15. The bottom plate 131 defines a sliding hole 139. In this embodiment, the casing 13 includes four sidewalls 132. The fixing plates 136 are arranged opposite to each other and extend from edges of two opposite sidewalls 132. One of the two opposite sidewalls 132 defines a through hole 138. The protruding plate 137 is adjacent and parallel to the sidewall 132 having the through hole 138, and the protruding plate 137 defines a through hole 138 coaxial with the through hole 138 of the sidewall 132. One of the two fixing plates 136 perpendicularly interconnects the protruding plate 137 and the sidewall 132 having the through hole 138. The through holes 138 define a common axis 135.

The sliding block 15 includes a first end 150 and a second end 151 opposite to the first end 150, and the first end 150 is adjacent to the sidewall 132 having the through hole 138. The sliding block 15 defines a threaded hole 159 at the first end 150 and a second mounting hole 152 at the second end 151. The threaded hole 159 is coaxial with the through holes 138. The second mounting hole 152 includes a second collaring hole 153 and a second guiding hole 156 connecting with each other. The screw head 105 of the mounting screw 10 can pass through the second guiding hole 156 and the fixing pole 102 can be blocked in the second collaring hole 153 by means of what is substantially a shearing function by the sliding block 15. The sliding block 15 is movably received in the receiving space 134 of the casing 13, and can move up and down along a direction parallel to the common axis 135 of the through holes 138.

The adjusting screw 16 includes a head portion 165 and an adjusting pole 162 connecting with the head portion 165. The head portion 165 has a greater diameter than that of the adjusting pole 162, and the adjusting pole 162 extends from a second stopper surface 168 of the head portion 165. The adjusting pole 162 has a screw thread 167 at a distal end of the adjusting pole 162. The adjusting pole 162 defines a fixing groove 169 around a circumference of the adjusting pole 162. The washer 17 sleeves on the adjusting pole 162 and is received in the fixing groove 169. The elastic member 18 sleeves on the adjusting pole 162, and is located between the distal end of the adjusting pole 162 and the washer 17.

Figure 3:
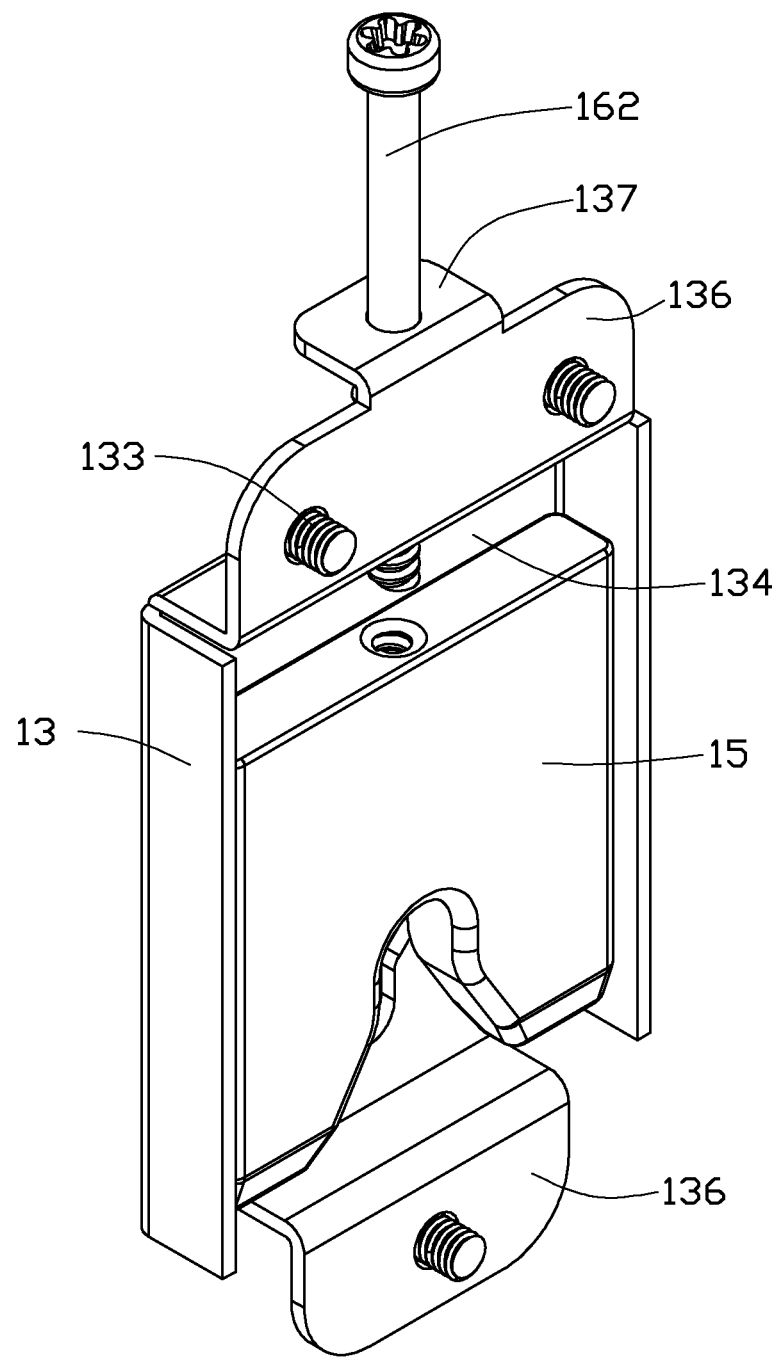
FIG. 3 is an assembled, isometric view of the wall-mounted aiding mechanism of FIG. 2, showing the sliding block in a first state.

Referring also to FIG. 1 and FIG. 3, in assembly of each wall-mounted aiding mechanism 12 and the main body 11, the fixing plates 136 of the casing 13 are fixed to the rear of the main body 11 via screws 133, with the sliding hole 139 corresponding to a first mounting hole 112 of the rear of the main body 11. The sliding block 15 is movably received in receiving space 134 of the casing 13. The adjusting pole 162 passes through the through holes 138. The washer 17 is fixed in fixing groove 169 of the adjusting pole 162, and is located between the protruding plate 137 and the sidewall 132 having the through hole 138, to prevent the adjusting pole 162 being detached from the casing 13. The elastic member 18 sleeves on the adjusting pole 162 and is sandwiched between the washer 17 and the sidewall 132 having the through hole 138. The elastic member 17 exerts resilient force when the adjusting pole 353 moves up and down along the direction parallel to the common axis 135.

Figure 4:
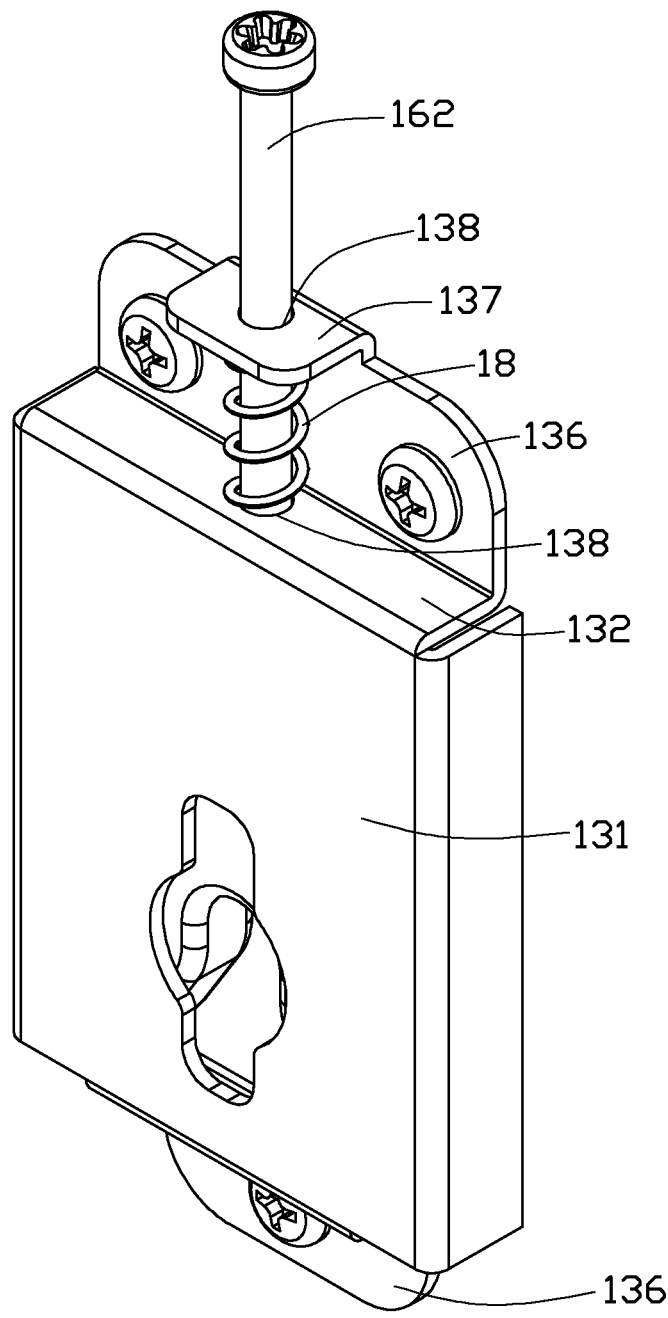
FIG. 4 shows the wall-mounted aiding mechanism of FIG. 3 viewed from a reverse direction.
Figure 5:
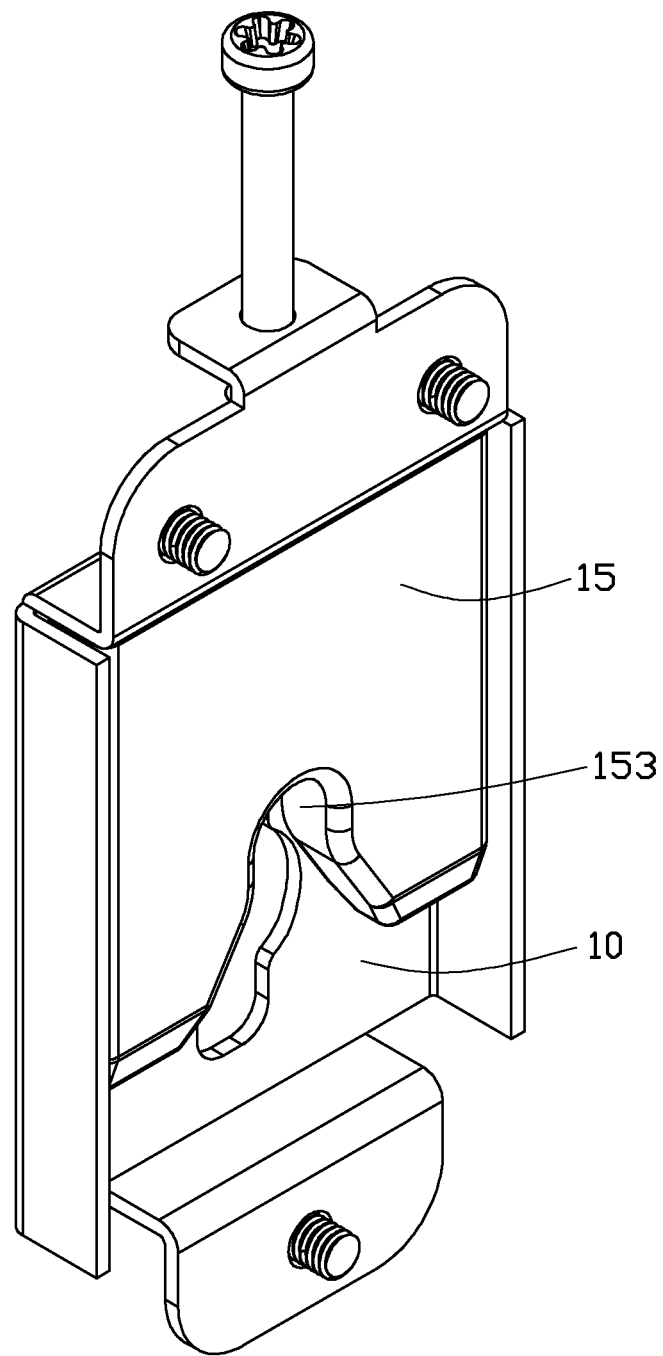
FIG. 5 is similar to FIG. 3, but shows the sliding block in a second state.
Figure 6:
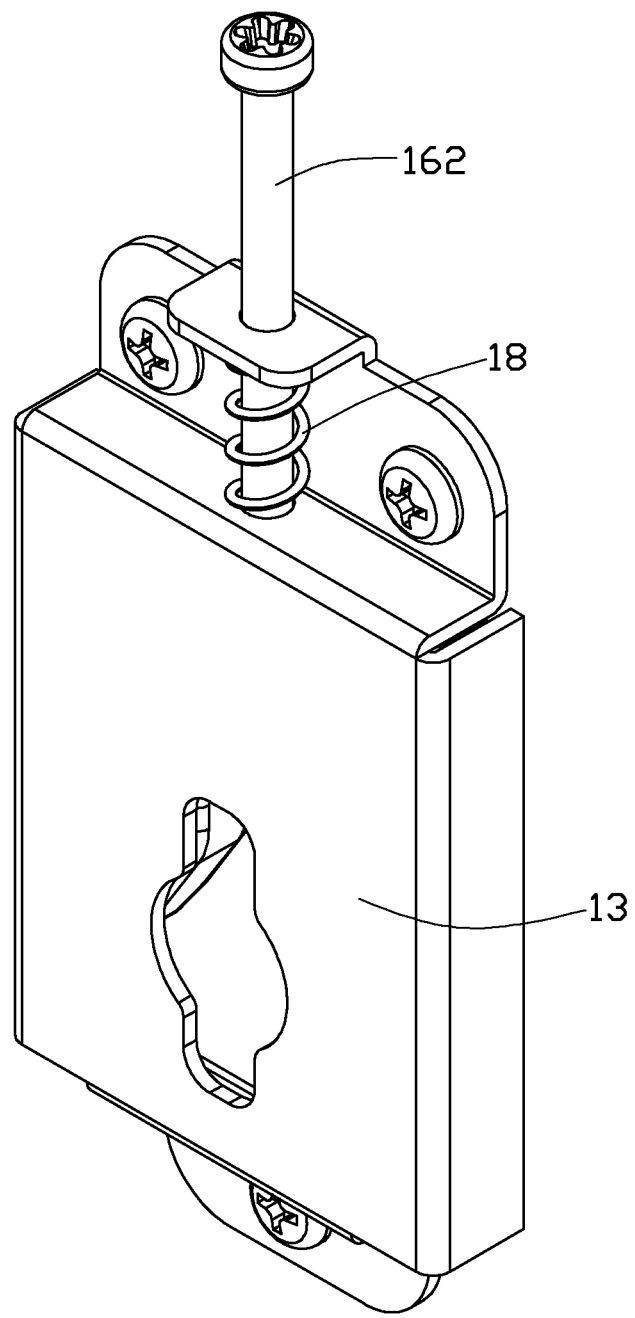
FIG. 6 shows the wall-mounted aiding mechanism of FIG. 5 viewed from a reverse direction.

The sliding block 15 can be in a first state (see FIGS. 3-4) or a second state (see FIGS. 5-6). When the sliding block 15 is in the first state, the sliding block 15 is disengaged with the adjusting pole 162, and the sliding block 15 moves down along the direction parallel to the common axis 135 due to gravity. When the sliding block 15 is in the second state, the screw thread 167 of the adjusting screw 16 is rotated into the threaded hole 159 of the sliding block 15, the sliding block 15 is thus engaged with the adjusting pole 162, and the sliding block 15 is thus lifted to a top position of the receiving space 134, such that the second collaring hole 153 of the second mounting hole 152 aligns with the first collaring hole 113 of the first mounting hole 112, and the second guiding hole 156 of the second mounting hole 152 aligns with the first guiding hole 116 of the first mounting hole 112.

Figure 7:
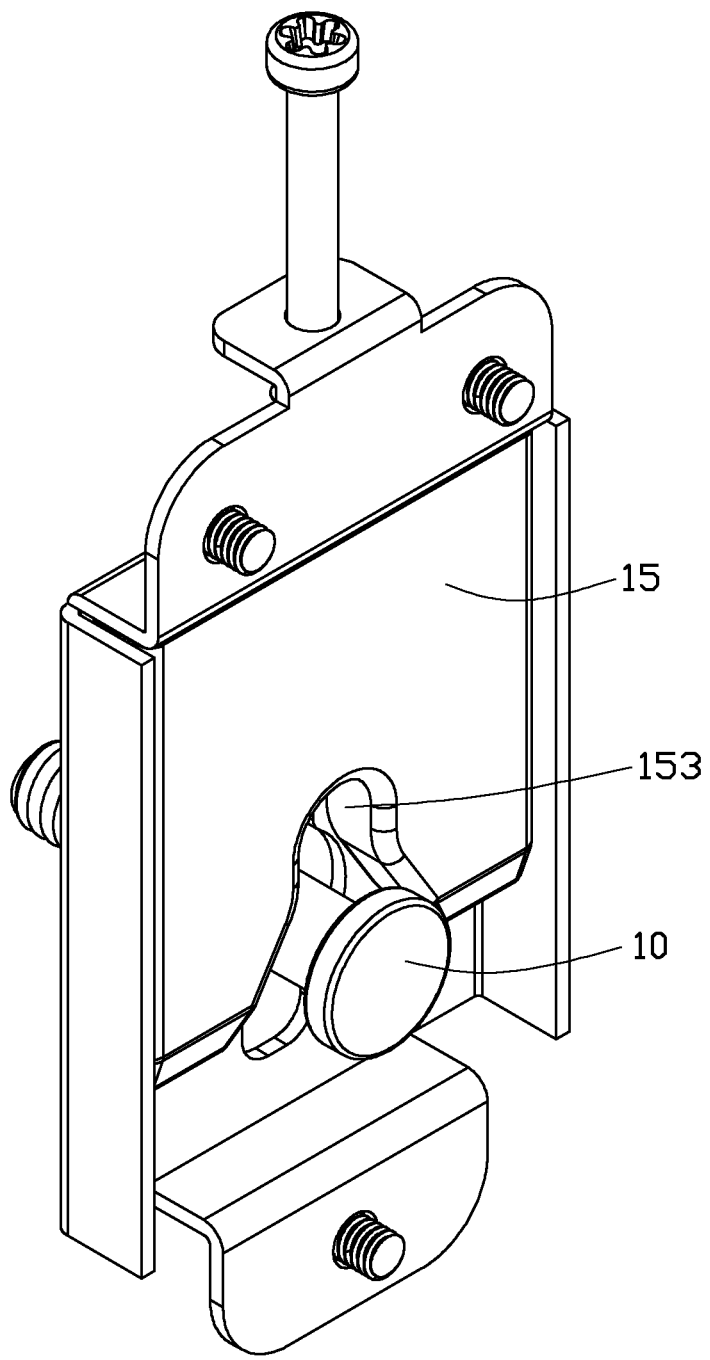
FIG. 7 shows the mounting screw inserting into a sliding hole of the casing, a second mounting hole of the sliding block.

Referring also to FIG. 7, to fix the main body 11 on the wall, the wall-mounted aiding mechanisms 12 are fixed to the rear of the main body 11, the mounting screws 10 are fixed in the wall, the sliding blocks 15 are lifted up to be in the second state, the screw heads 105 and the fixing poles 102 of the mounting screws 10 are passed through the sliding holes 139, the second guiding holes 156 and the first guiding holes 116. Then the main body 11 is pushed to move relative to the mounting screws 10 to let the fixing poles 102 to slide from the guiding holes 156, 116 into the collaring holes 153, 113. Thus, the main body 11 is supported on the mounting screws 10, and the main body 11 is mounted on the wall. After that, the adjusting screws 16 are turned to change the sliding blocks 15 to the first state from the second state. Such that, in the first state, the adjusting screws 16 disengage with the sliding blocks 15 to let the sliding blocks 15 drop onto the fixing poles 102 of the mounting screws 10 and hold it secure.

Figure 8:
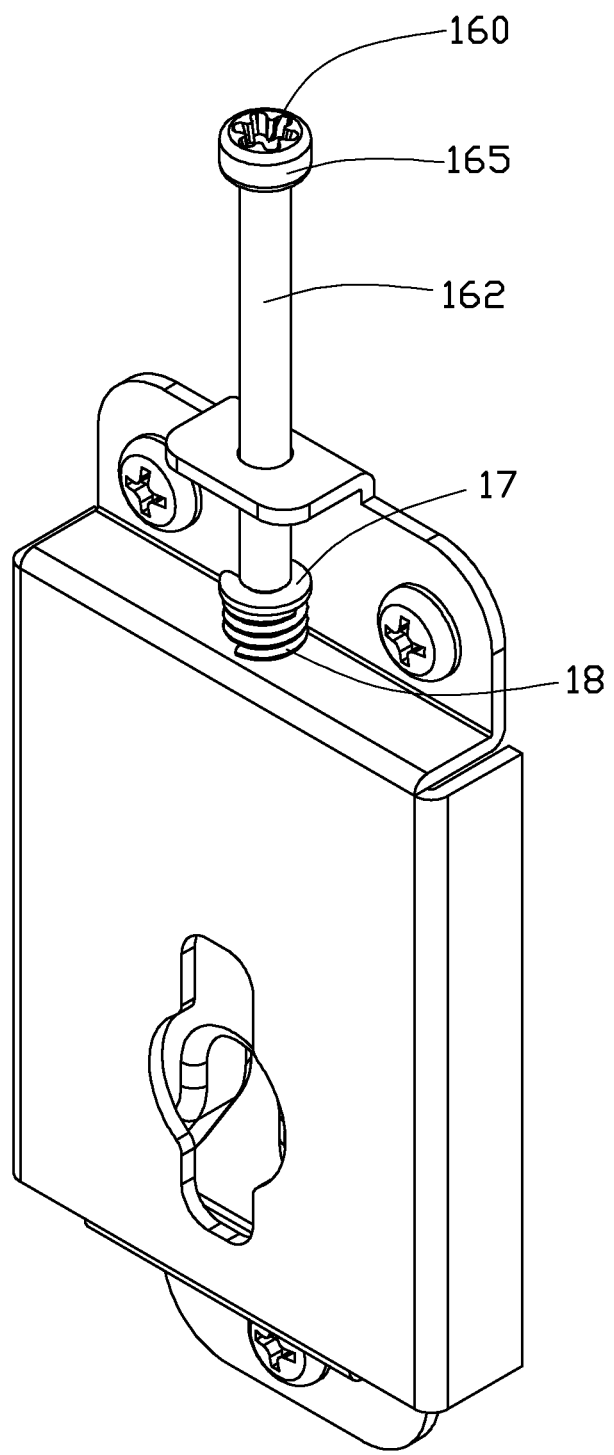
FIG. 8 shows the mounting screw captive in the second mounting hole of the sliding block in the first state.
Figure 9:
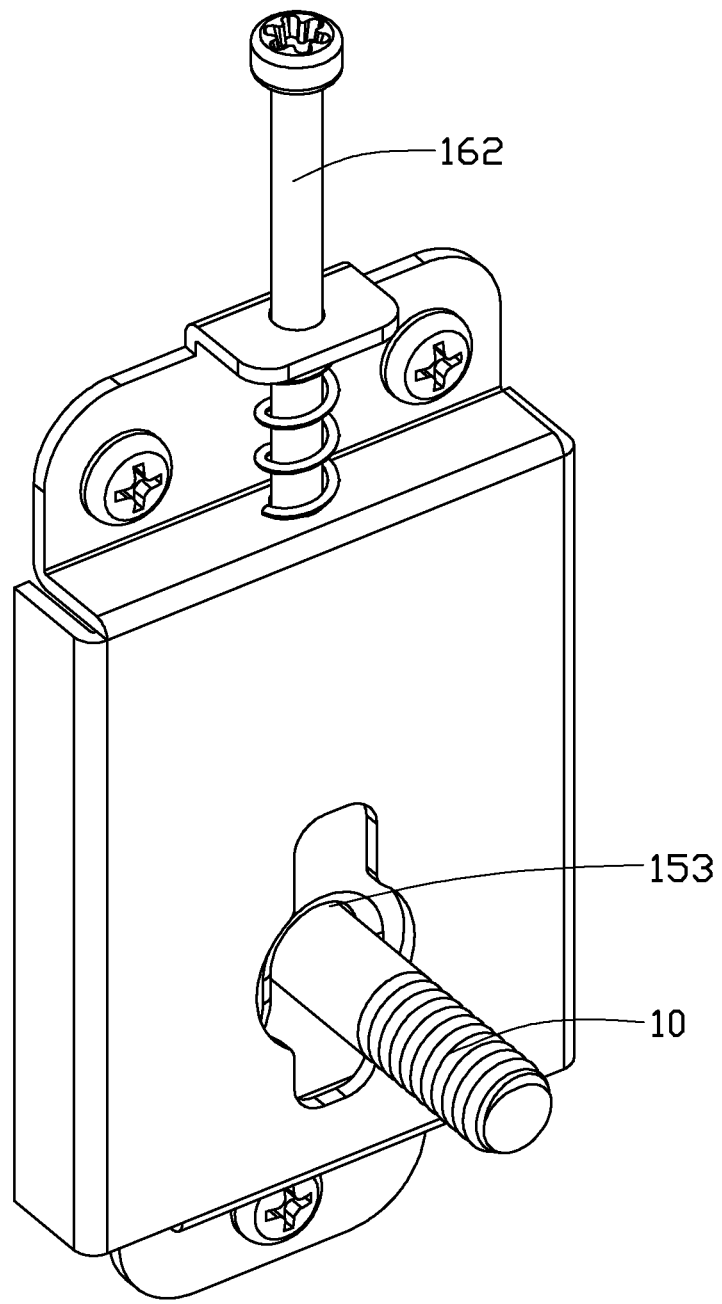
FIG. 9 shows the wall-mounted aiding mechanism of FIG. 8 viewed from a reverse direction.

With the above-described configuration, when the main body 11 is impacted by an external force, and the main body 11 is pushed to move relative to the mounting screws 10, because the sliding blocks 15 are disengaged from the adjusting poles 162 after the main body 11 is mounted on the wall, and the sliding blocks 15 are movable in the receiving spaces 134, the sliding blocks are still supported on the mounting screws 10, and the fixing poles 102 are still held captive in the second collaring holes 156 of the sliding block 15 when the main body 11 is pushed to move relative to the mounting screws 10. The first stopper surfaces 108 of the mounting screws 10 prevent the mounting screws from detaching from the wall-mounted aiding mechanisms 12 (see FIGS. 8-9). Therefore, the main body 11 is always firmly mounted on the wall.

It is believed that the present embodiments and their advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:
1. A wall-mounted aiding mechanism, comprising:
a casing comprising a base body, the base body comprising a bottom plate and a plurality of sidewalls, the bottom plate and the sidewalls cooperatively forming a receiving space, one of the sidewalls defining a through hole communicated with the receiving space, and the bottom plate defining a sliding hole configured to allow a mounting screw to slide in the sliding hole;
an adjusting screw configured to pass into the receiving space via the through hole and move up and down along an common axis of the through hole and the adjusting screw; and
a sliding block movably received in the receiving space and switchable between a first state and a second state, the sliding block comprising a first end and a second end opposite to the first end, the second end defining a mounting hole comprising a collaring hole to allow the mounting screw to be fixed at the collaring hole;
wherein in the first state, the sliding block disengages with the adjusting screw at the first end and is movable down along the direction parallel to the common axis of the through hole and the adjusting screw due to gravity; wherein in the second state, the sliding block engages with the adjusting screw and is lifted to a top position of the receiving space.

2. The wall-mounted aiding mechanism of claim 1, wherein the adjusting screw comprises an adjusting pole, the adjusting pole comprises a screw thread at a distal end of the adjusting pole, the first end of the sliding block defines a threaded hole, and the sliding block engages with the adjusting pole via the screw thread and the threaded hole.

3. The wall-mounted aiding mechanism of claim 1, wherein the mounting hole further comprising a guiding hole connecting the collaring hole, and the mounting screw passes through the guiding hole and slides into the collaring hole from the guiding hole.

4. The wall-mounted aiding mechanism of claim 1, wherein the casing further comprises two fixing plates, the two fixing plates are arranged opposite to each other and extend from edges of two opposite sidewalls of the casing, and one of the two opposite sidewalls defines the through hole.

5. The wall-mounted aiding mechanism of claim 1, wherein the casing further comprises a protruding plate parallel and adjacent to the sidewall having the through hole, one of the two fixing plates perpendicularly interconnects the sidewall having the through hole and the protruding plate, the protruding plate defines a through hole which is coaxial with the through hole of the sidewall, and the adjusting screw passes through the through holes of the sidewall and the protruding plate.

6. The wall-mounted aiding mechanism of claim 5, wherein the adjusting screw comprises a head portion and an adjusting pole, the adjusting pole comprises a screw thread at a distal end of the adjusting pole and defines a fixing groove around a circumference of the adjusting pole.

7. The wall-mounted aiding mechanism of claim 6, further comprising a washer and an elastic member, wherein the washer sleeves on the adjusting pole and is received in the fixing groove, and is located between the protruding plate and the sidewall having the through hole, to prevent the adjusting pole being detached from the casing, the elastic member sleeves on the adjusting pole, and is sandwiched between the washer and the sidewall having the through hole.

8. A wall-mounted device, comprising:
a main body, wherein a rear of the main body defines a first mounting hole comprising a first guiding hole and a first collaring hole connecting the first guiding hole;
a mounting screw comprising a screw head and a fixing pole connecting with the screw head, the fixing pole configured to be fixed in a wall at a distal end of the fixing pole, the screw head of the mounting screw passable through the first guiding hole and the fixing pole be blocked in the first collaring hole; and
a wall-mounted aiding mechanism; comprising:
a casing configured to be fixed to the rear of the main body, the casing comprising a base body, the base body comprising a bottom plate and a plurality of sidewalls, the bottom plate and the sidewalls cooperatively forming a receiving space, one of the sidewalls defining a through hole communicated with the receiving space, and the bottom plate defining a sliding hole configured to allow the mounting screw to slide in the sliding hole;
an adjusting screw configured to pass into the receiving space via the through hole and move up and down along an common axis of the through hole and the adjusting screw; and
a sliding block movably received in the receiving space and switchable between a first state and a second state, the sliding block comprising a first end and a second end opposite to the first end, the second end defining a second mounting hole comprising a second collaring hole to allow the mounting screw to be fixed at the collaring hole;
wherein in the first state, the sliding block disengages with the adjusting screw at the first end and moveable down along the direction parallel to the common axis of the through hole and the adjusting screw due to gravity; wherein in the second state, the sliding block engages with the adjusting screw and is lifted to a top position of the receiving space.

9. The wall-mounted aiding mechanism of claim 8, wherein the adjusting screw comprises an adjusting pole, the adjusting pole comprises a screw thread at a distal end of the adjusting pole, the first end of the sliding block defines a threaded hole, and the sliding block engages with the adjusting pole via the screw thread and the threaded hole.

10. The wall-mounted aiding mechanism of claim 8, wherein the second mounting hole further comprising a second guiding hole connecting with the second collaring hole, and the mounting screw passes through the first and second guiding holes and slides into the first and second collaring holes from the first and second guiding holes.

11. The wall-mounted aiding mechanism of claim 8, wherein the casing further comprises two fixing plates, the two fixing plates are arranged opposite to each other and extend from edges of two opposite sidewalls of the casing, and one of the two opposite sidewalls defines the through hole.

12. The wall-mounted aiding mechanism of claim 8, wherein the casing further comprises a protruding plate parallel and adjacent to the sidewall having the through hole, one of the two fixing plates perpendicularly interconnects the sidewall having the through hole and the protruding plate, the protruding plate defines a through hole which is coaxial with the through hole of the sidewall and the adjusting screw passes through the through holes of the sidewall and the protruding plate.

13. The wall-mounted aiding mechanism of claim 12, wherein the adjusting screw comprises a head portion and an adjusting pole, the adjusting pole comprises a screw thread at a distal end of the adjusting pole and defines a fixing groove around a circumference of the adjusting pole.

14. The wall-mounted aiding mechanism of claim 13, further comprising a washer and an elastic member, wherein the washer sleeves on the adjusting pole and is received in the fixing groove, and is located between the protruding plate and the sidewall having the through hole to prevent the adjusting pole being detached from the casing, the elastic member sleeves on the adjusting pole, and is sandwiched between the washer and the sidewall having the through hole.

* * * * *